Feb. 2, 1954
E. LIST
2,668,251
ELECTROMAGNETIC OSCILLATORY MOTOR PROVIDED
WITH A CUTTING-ACTION CORE
Filed March 27, 1951
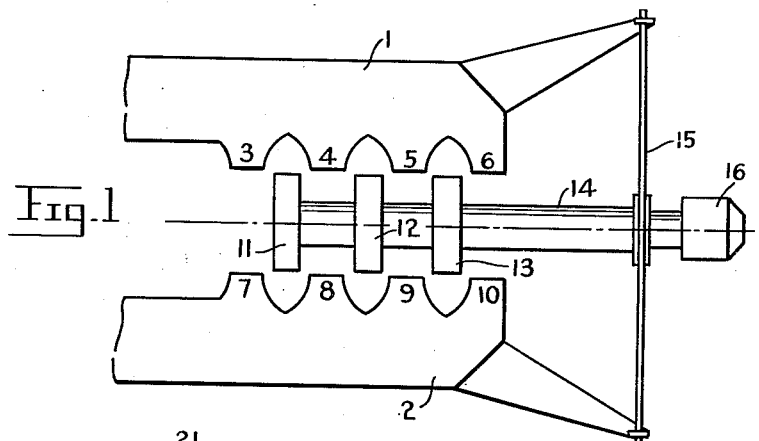
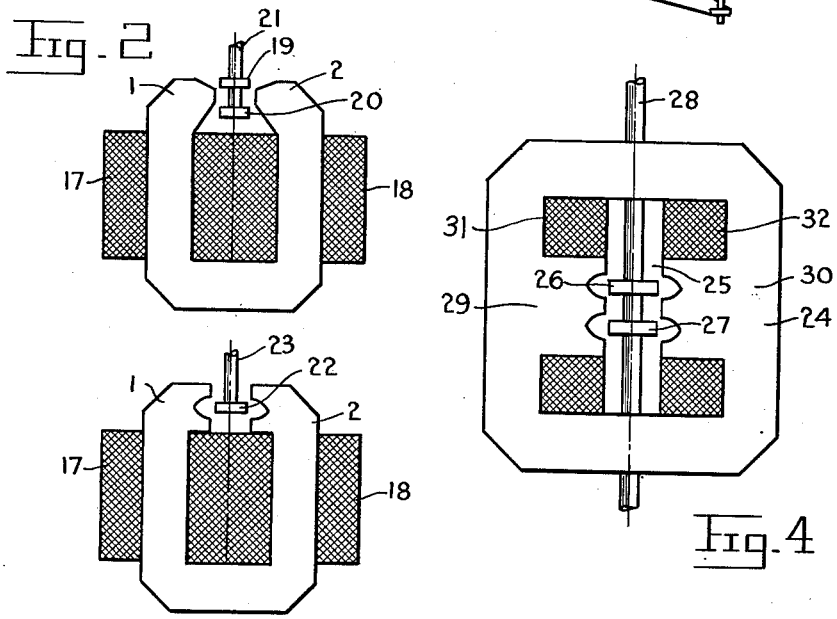
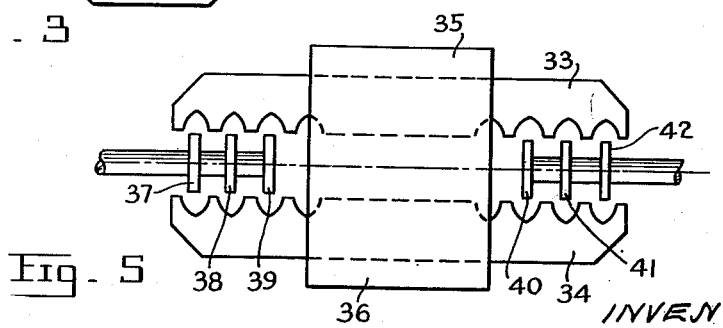
INVENTOR
ENRIQUE LIST
By [signature] Atty Patented Feb. 2, 1954

2,668,251

UNITED STATES PATENT OFFICE 2,668,251

ELECTROMAGNETIC OSCILLATORY MOTOR PROVIDED WITH A CUTTING-ACTION CORE

Enrique List, Buenos Aires, Argentina, assignor to ITEM Sociedad de Responsabilidad Limitada, Buenos Aires, Argentina, an Argentine corporation Application March 27, 1951, Serial No. 217,695

7 Claims. (Cl. 310—28)

The present invention refers to an oscillating electro-magnetic motor having a cutting-action core provided with one or several teeth, said core oscillating at a frequency of sixty cycles, for example.

Oscillating electro-magnetic motors, as compared with rotatory motors, have the advantage that alternating electric energy is transformed directly into mechanical energy, thus completely eliminating any loss through friction, and enabling the motor to be of easier and cheaper build.

Several primitive embodiments of such oscillating motors are known. Their core is a flat, membrane-shaped spring which is attracted by electromagnetic force at a rhythm corresponding to the oscillation of the alternating current. Some newer versions are capable of a higher power output than those mentioned above. One group of these new arrangements is characterized by a cutting-action core, which means to say that the confronting faces of the core and the pole, respectively, do not unite but that the core slides laterally over the faces of the poles, between which said core constitutes a magnetic bridge. A particular feature of this construction is that the poles and the core of the electromagnet possess a number of teeth, producing an increase in the oscillatory force.

The oscillatory frequency of all these devices is double that of the alternating current, in other words, their frequency is 120 c./s. inasmuch as the core is attracted at each half-wave while a previously arranged operative spring draws the core back when the currency curve approximates the zero value.

A 120 c./s. frequency is too high for many technical applications. In order to reduce same to 60 c./s. the polarization method was devised, i. e., the exciter coil is connected to a source of direct current, on which the alternating current is impressed. The result attained by this is that the magnetic flux within the iron does not change its direction periodically, but fluctuates instead between a maximum and a minimum value, in the same direction and at a frequency of 60 c./s. a mechanical oscillation being produced thereby, corresponding to the same frequency.

The main disadvantage of this procedure is that the saturation zone of the iron is reached.

Another system for producing a 60 c./s. oscillation consists in suppressing a half-wave by means of a valve, the disadvantage here being that the iron, with regard to its magnetic capacity, is only used in one direction.

The present invention enables a 60 c./s. oscillation to be obtained without utilizing electromagnetic polarization and without suppressing a half-wave. Its principal feature is that the core, together with all its additional part, such as the toolholder, the tool itself, the plunger of a pump, or what ever else be employed, as likewise the suspension and working springs, are tuned at their own frequency, which is more or less that of the alternating current, and that the neutral position of the core consists in that its teeth confront or nearly confront the spaces between the polar teeth of the stator. A 60 c./s. oscillation is thus produced, advantage being taken of all the iron circuit in both directions of the core's movement; the load on the spring, besides, is reduced considerably. The 60 c./s. frequency can also be obtained if the core frequency, and that of additional parts oscillating together with same, be not exactly but only approximately 60 c./s.

The constructive particularity of this embodiment, residing in that the core teeth confront the spaces between the stator pole teeth, causes that the stator has one tooth more than the core. It is also possible that each stator pole have one tooth less than the core, in which case each tooth of one pole is placed in front of the spaces left between the core teeth.

Another variation consists in providing the core with the same number of teeth as the poles. In this case the force of the thrust in one direction will be greater than in the other, advantage being taken of that circumstance in operations where greater strength is required in one direction than in the other.

In order to reduce the oscillating masses as much as possible, the dimensions and volume of the core are made to represent only a small portion of the total weight of the magnetic circuit.

In order that the present invention may be more clearly understood and readily put into practice, several embodiments thereof will now be described with particular reference to the accompanying sheet of drawings. All these embodiments have in common that the core or cores can also be iron rods, inasmuch as it is not absolutely necessary that same consist of iron packages. A further particular feature is that the air gaps and the core are very close to the coil, or even inside of same, thus reducing to a minimum the magnetic dispersion flux.

Figures 1 to 5 illustrate elevational views of five forms of the invention.

In detail, Figure 1 illustrates an embodiment of the invention in which 1 and 2 are poles of an electromagnet that may have any convenient shape. Each of these poles is provided with four teeth confronting one another and respectively numbered 3 through 10. The core is likewise dented and comprises a number of plates 11, 12 and 13, i. e., it has one tooth less than the poles of the stator. The teeth of the core are joined together by the bar indicated by reference 14 which in turn is connected to an elastic finger 15. This finger serves as an elastic seating and suspension, respectively and allows the core to move in a lengthwise direction only. Spring finger 15 is associated with a toolholder 16 which, in some other applications of the motor, can be replaced by a pump plunger or other machine elements whose operation requires oscillating motion.

The assembly formed by plates 11, 12, 13 and bar 14, finger 15 and toolholder 16 is tuned to its own frequency of about 60 c./s., but same may vary between more or less 20 up to 75 c./s. Much lower frequencies than 60 c./s. can be very advantageous inasmuch as the springs suffer less load the lower the frequency of the system, the magnetic field and its forces assuming, in a certain manner, part of the spring's function.

The neutral position of the core, as seen in the drawing, consists in that the core teeth confront the spaces between the stator teeth.

If the electromagnet is connected to a source of alternating current, a magnetic tension is produced between poles 1 and 2 and plates 11, 12 and 13 of the core tend to take up a position where they form a magnetic bridge between the corresponding polar teeth. Let it be supposed, for example, that when the first half-wave of the alternating current occurs, the core moves one step to the left, in such a manner that its plate 11 forms a magnetic bridge between teeth 3 and 7, plate 12 doing likewise between teeth 4 and 8 and plate 13 between teeth 5 and 9. When the alternating current reaches zero value, spring finger 15 withdraws the core to the neutral position, illustrated in Figure 1. The negative half-wave of alternating current that immediately follows, again magnetizes the electromagnet, and the core now moves to the right, following in this motion until plate 11 forms a magnetic bridge between polar teeth 4 and 8, and plate 12 does likewise between teeth 5 and 10. When the alternating current again reaches zero value, spring 15 withdraws the core to its neutral position, thrusting it once more to the left; the core will move in the same direction until it again occupies a position where plate 11 confronts teeth 3 and 7 when the value of the current has reached a positive maximum. The frequency thus produced is 60 c./s. or, in general, that of the frequency of the alternating current.

The four teeth on each pole illustrated in Figure 1 are shown as an example only inasmuch as, according to the invention, there may be any other number of teeth. The possible variation in the number of core and pole teeth enables the designer to vary the characteristics of the oscillatory motor for, by increasing the number of teeth the stroke of the core is diminished and the force of the thrust is increased, while a reduction in the number of teeth increases the length of the core stroke and diminishes the strength of the thrust.

Figures 2 and 3 illustrate an embodiment of an oscillatory motor in which the stator package forms a U between whose poles the core is placed.

In Figure 2, poles 1 and 2 of the electromagnet provided with coils 17 and 18 are of reduced section and form two confronting teeth. The core is formed of two plates 19 and 20 joined by bar 21. This bar, in turn, is connected to a spring equipped with a toolholder, not shown in Figure 2 nor in subsequent figures, due to similarity with Figure 1.

The position shown in the figure corresponds to the neutral position of the core, the operation being the same as described in connection with Figure 1.

Figure 3 shows a magnet equal to that of Figure 2 with the sole exception that each of poles 1 and 2 has two teeth instead of one, while the core has only one plate 22, joined to bar 23 transmitting the thrust to the tool.

Figure 4 represents an embodiment in which the stator package 24 has the shape of a shell-type transformer the core of which is provided with an indented recess 25 to receive the mobile core. This mobile core in the drawing is shown as formed by two plates 26 and 27 joined to bar 28. Poles 29 and 30 of the stator have three teeth each. When coils 31 and 32 are connected to a source of alternating current, the mobile core is displaced longitudinally, as already explained in connection with Figure 1.

Figure 5 shows another embodiment of the invention wherein the stator is formed by two elongated packages 33 and 34 equipped with coils 35 and 36. Between both extremes of these iron packages, forming four poles with four teeth each, the cores are placed, consisting each of three iron plates 37, 38 and 39, on one side, and 40, 41 and 42 on the other. These cores, according to the invention, can move in a uniform direction, being intercommunicated by means of an appropriate device.

The frequencies mentioned in the preceding description refer to the case of a 60 c./s. alternating current supply line. Where the frequency differs from 60 c./s., the numbers given must be similarly modified.

The invention as herein described and illustrated, may be clearly understood and additional explanations will not be required by those versed in the matter.

What is claimed is:

1. An oscillatory electromagnetic motor, fit for driving machine tools of large power requirements, comprising a stator having two pole portions and an armature positioned in the space between said pole portions, each pole portion and the armature having a series of projections with spaces therebetween, the projections of each pole portion having the same polarity, said armature being so proportioned, shaped and dimensioned with respect to its associated parts as to become resonant at line frequency, the static position of the armature being such that the projections thereof confront each respective opposite space centrally between the projections of the pole portions and the sum of the breadth of one projection and one adjacent space being equal to the length of the desired stroke of the armature.

2. The oscillatory electromagnetic motor described in claim 1, wherein the number of projections of one stator pole portion and the number of projections of the other stator pole are equal, and said projections of the said armature differ by one from the said pole projections.

3. The oscillatory electromagnetic motor described in claim 1, wherein the number of projections of one stator pole portion and the number of projections of the other stator pole are equal, and said projections of the said armature are equal to said pole projections.

4. The oscillatory electromagnetic motor described in claim 1, wherein the said armature weight and volume is relatively small as compared with the total weight of said motor.

5. The oscillatory electromagnetic motor described in claim 1, wherein the said stator is of the shape of a shell-type transformer and having a core formed with an indented recess in which said armature is mounted for movement.

6. The oscillatory electromagnetic motor described in claim 1, wherein the said stator is of V-shape configuration and said armature is positioned in the space between the ends of the legs of the said V-shaped stator.

7. The oscillatory electromagnetic motor described in claim 1, wherein the said stator comprises two stacks of metal plates arranged in spaced apart parallel relation to each other, and a coil wound around each respective stack of plates between the ends thereof.

ENRIQUE LIST.

References Cited in the file of this patent

UNITED STATES PATENTS

| Number | Name | Date |
| --- | --- | --- |
| 2,434,671 | Murphy | Jan. 20, 1948 |

FOREIGN PATENTS

| Number | Country | Date |
| --- | --- | --- |
| 498,041 | Great Britain | Jan. 3, 1939 |
| 594,770 | Great Britain | Nov. 19, 1947 |
| 685,090 | France | Mar. 25, 1930 |
| 855,110 | France | Feb. 5, 1940 |